Jan. 11, 1955     R. W. ROGERS     2,699,064
DEVICE FOR MEASURING FORCE
Filed July 1, 1952     3 Sheets-Sheet 1
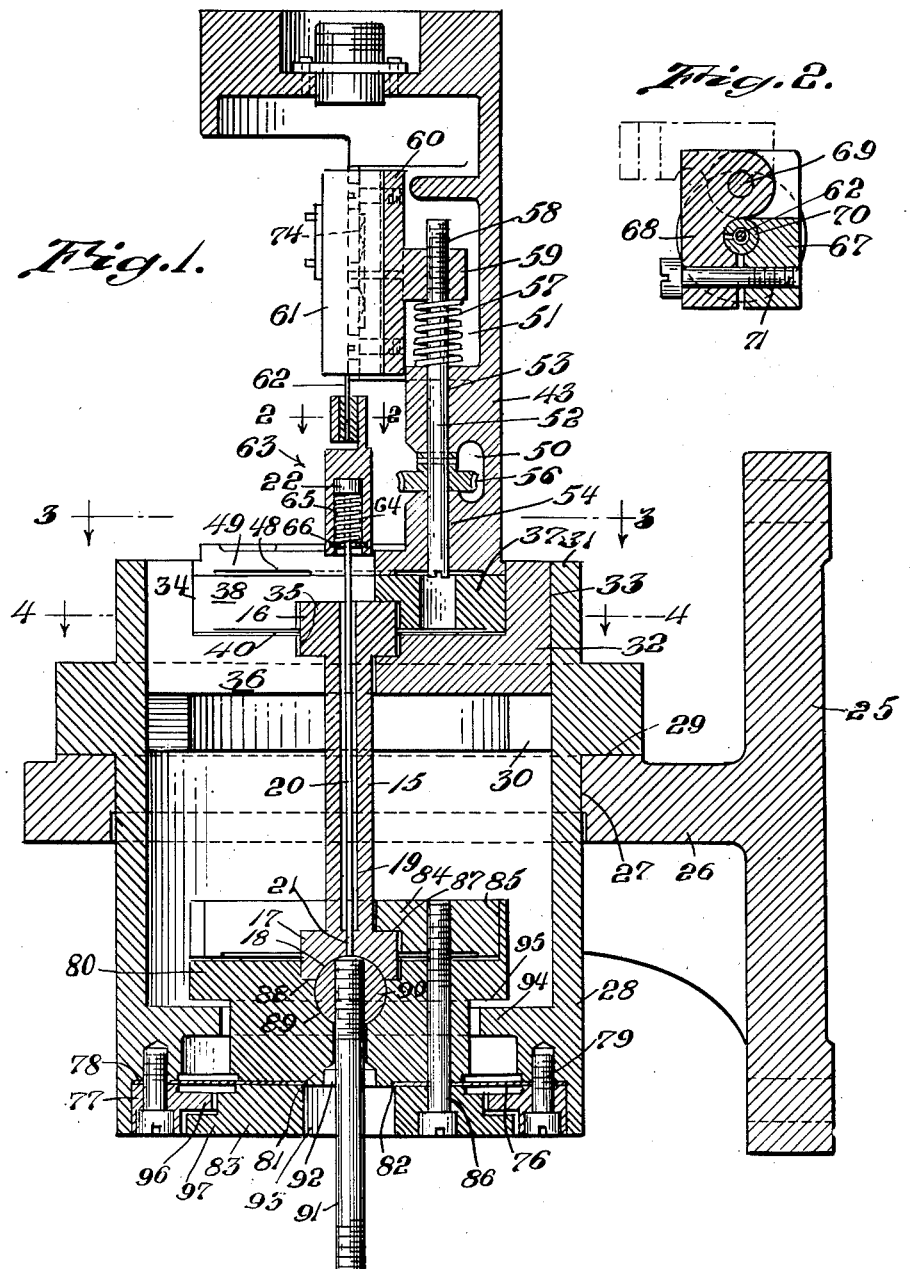
INVENTOR.
Robert W. Rogers
BY
Barbour & Barbour
ATTORNEYS.

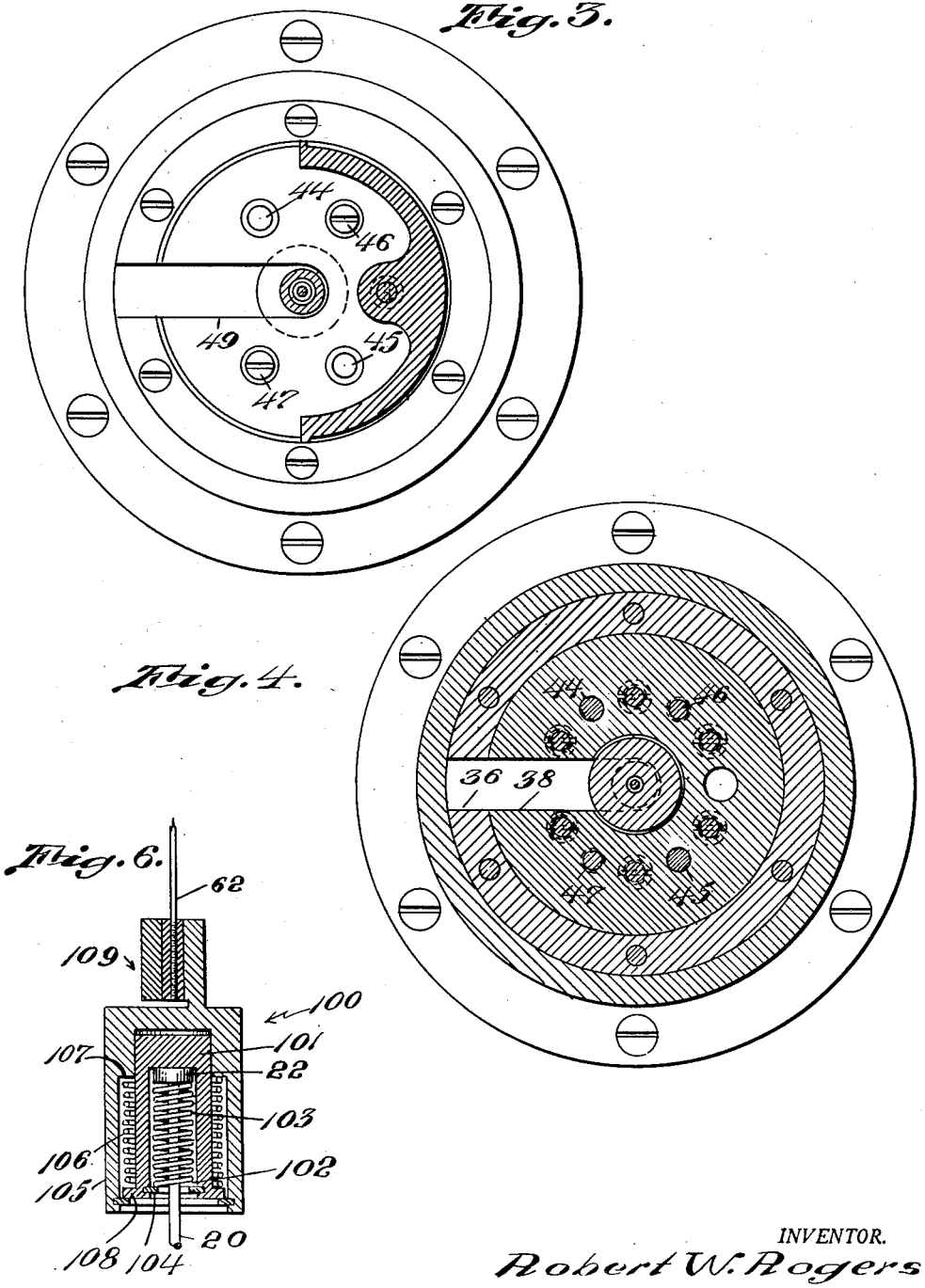

Jan. 11, 1955  R. W. ROGERS  2,699,064
DEVICE FOR MEASURING FORCE
Filed July 1, 1952  3 Sheets-Sheet 3

INVENTOR.
Robert W. Rogers
BY
Barlow & Barlow
ATTORNEYS.

United States Patent Office 2,699,064
Patented Jan. 11, 1955

2,699,064

DEVICE FOR MEASURING FORCE

Robert W. Rogers, Barrington, R. I., assignor to Scott Testers, Inc., a corporation of Rhode Island Application July 1, 1952, Serial No. 296,582

11 Claims. (Cl. 73—141)

This application is a continuation in part of applicant's copending case, Serial No. 255,293, filed November 7, 1951.

This invention relates to a device for very accurately measuring applied force, such for instance as may occur in a testing or weighing machine.

One of the objects of the invention is to provide a device which will measure applied force with very minute movement such as may exist in the tension or compression of metal.

Another object of the invention is to provide a device in which the minute movement may be measured whether in a compressive relation or a tension relation of the parts under test.

Another object of the invention is to provide a device in which the range of operation may be readily changed so that by the substitution of one unit the range of the device may be changed to other ranges for similar operation.

Another object of the invention is to provide quick and easy interchangeability of the parts for varying the range of operation.

With these and other objects in view, the invention consists of certain novel features of construction as will be more fully described and particularly pointed out in the appended claims.

In the accompanying drawings:

Figure 1 is a sectional view showing the parts in assembled relation with the spool through which the force is applied as being clamped in position in the device;

Figure 2 is a section on line 2—2 of Figure 1;

Figure 3 is a section on line 3—3 of Figure 1;

Figure 4 is a section on line 4—4 of Figure 1;

Figure 6 is a sectional view of a modified form of coupling.

Figure 5:
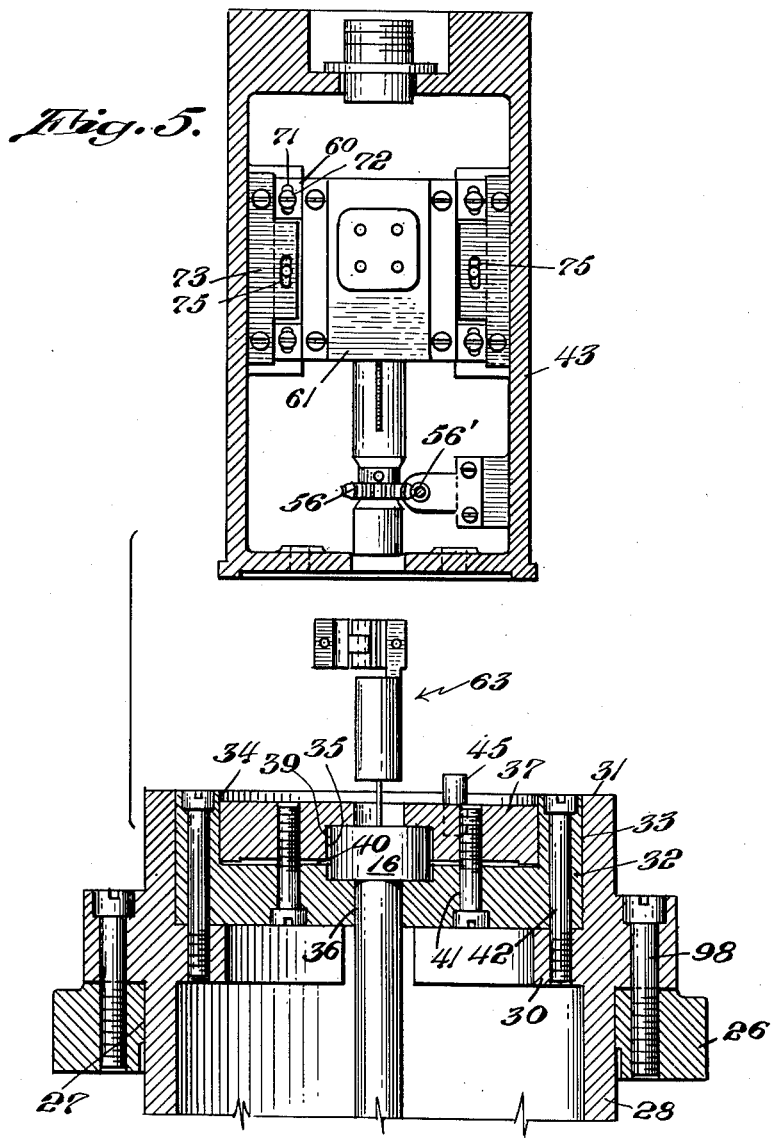
Figure 5 is a sectional view of the upper parts of Figure 1 in exploded relation, illustrating the supporting frame as detached from the interchangeable unit and the interchangeable unit fragmentally shown.

In proceeding with this invention, I utilize a gauge whose full-scale operation comprises a minute movement in the order of .0015 of an inch for its operation and is of the character illustrated in Patent 2,543,601. In the utilization of a device of this character, I provide a spool which in one form has a uniform cross section through the effective length thereof and in another form may be of other construction. In all cases they are provided with heads at the ends of their expanding portions which are of sufficient mass so that they will be ineffective in elongation and which heads also afford means to enable the spool to be gripped. I then clamp this spool by its heads and apply the force through this spool either in tension or compression, and thus by the minute movements which may occur in the body of the spool and which may be measured by the gauge above indicated, I am able to measure the force applied either in tension or compression upon some object or the work under test. Because the deformation of the spool is proportional to the force applied, the electrical output is in linear relationship to that force and may be translated for use by any of the well-known forms of indicating or recording apparatus. I have further provided for varying the capacity of the device by interchanging a unit which fits readily into the stand for supporting the device and accomplishing this by mounting the same framework which carries the gauge on the interchangeable unit.

With reference to the drawings, the cylindrical type of spool through which force is applied is shown in Figure 1 and comprises a barrel portion 15 which is of uniform cross section throughout its axial extent and which is preferably formed of some metal of high quality, homogeneous material. The upper head 16 is of the same piece of metal as the barrel, as is likewise the lower head 17. The lower head is recessed as at 18 to provide space for the positioning of a ball and socket connection to the clamp. A uniform central bore 19 extends axially through the length of the barrel 15 and the head 16 and stops exactly even with the top of the head 17. A rod 20 of a size much smaller than the bore extends through the bore centrally thereof and is anchored by welding at 21 at the end of the barrel and in the head 17, while this rod extends freely through the head 16. This rod is provided with an enlargement or abutment 22 at its upper end.

Clamps grip the opposite heads of the spool, which clamps are supported as will now be described. As shown in Figure 1, a bracket 25 has a shelf 26 extending therefrom provided with a central cylindrical opening 27 in which there is fixed a cylindrical housing 28 having a shoulder at 29 to engage the margin of the cylindrical opening 27 so that the housing may rest in this bracket. This cylindrical housing is generally hollow but is provided with an inwardly extending flange 30 at a point spaced from its upper end 31. The lower member 32 of the upper clamp which grips the heads 16 slidably fits the inner guiding surface 33 of the housing and rests upon the flange 30. It is recessed as at 34 in one diameter and further recessed as at 35 in another diameter, which latter recess receives the lower portion of the head 16 of the spool, while the barrel 15 of the spool extends through the slot 36 of the member 32 with the head of the spool engaging the marginal edges on either side of the slot. The upper member 37 of the clamp is slotted at 38 and is of a size to fit the recess 34 and is itself recessed in its lower surface as at 39 to receive the upper portion of the head 16 of the spool and recessed about this recess as at 40 so that this spool may be tightly bound between the two members 32 and 37 when moved axially of the spool toward each other. These members are securely fastened together by bolts 41 as shown in Figure 5, while the clamp is securely held to the flange 30 by bolts 42. Each of these bolts have their heads sunken into the member 32 as shown in Figure 5.

Rising from the lower portion of member 37 there is a separate upright frame 43 shown detached in Figure 5 which is cut away at its front as shown in Figure 1. This supporting frame 43 has its lower end of a size to fit with the recess 34 and is aligned on the upper clamping plate 37 by means of two dowels 44 and 45 and screws 46 and 47, the latter of which secure it to the clamping member 37. This lower portion is also recessed at its bottom surface at 48 and is slotted as at 49 corresponding and registering with the slot 38 and 36. This frame is recessed as at 50 and 51, and a shaft 52 extends through the bore 53 joining the recesses 50 and 51 and through the bore 54 which is in axial line with the bore 46 and which joins the recesses 50 and the lower end of the frame. A hole 55 in clamp 38 is in axial alignment with shaft 52. A worm wheel 56 is located in the recess 50 and is fixed to the shaft 52. This worm wheel is engaged by a worm 56' and provides a means of rotating shaft 52 for adjustment purposes. The upper end of the shaft 52 passes through a spring 57 to take up back lash and is threaded as at 58 and extends through the boss 59 of a carrier 60 to which a gauge 61 is secured by cap screws. This gauge is of the type illustrated in Patent 2,453,601. This gauge has an actuating threaded stem 62 extending downwardly therefrom which is connected to the upper end of the rod 20 by a coupling 63 (see also Fig. 2) which coupling has a bore 64 into which the abutment 22 on the end of rod 20 extends, while a spring 65 encircling the rod abuts against a spring ring 66 which is snapped into a recess in the bore and serves as an abutment for the other end of the spring. This spring will be of a capacity so that under normal operation the spring will not flex. The capacity of the spring is such, however, that it will flex prior to applying a damaging tension on the gauge 61. The arrangement is such that the spring will flex and the clamp will be engaged by limiting stops to be described before damage occurs. The coupling is provided with a fixed jaw 67 (see Fig. 2) and a jaw 68 pivoted as at 69 which may swing so as to engage the stem 62, which is surrounded by sleeve 70 of soft metal such as aluminum which compresses it into engagement with the threads of the stem to be held in binding engagement therewith by the screw 71.

The carrier 60 is provided with slots 71 through which lock screws 72 extend to bind it in position while permitting a small vertical movement thereof when loosened. Gibs 73 overlap this carrier and provide a guideway therefor. Springs 74 of wavy form between the gibs and carrier urge it against the casting when the lock screws are loosened for movement of the carrier. Pins 75 on the carrier extend through the springs and into slots in the gibs so that the vertical location of the carrier may be known in setting the device.

The clamp for the lower head 17 of the spool is mounted upon a diaphragm 76 which is secured in the recessed bore in the lower end of the cylindrical housing 28 as shown in Figure 1 by means of a collar 77 which engages the outer margin of the diaphragm 76 and by means of screws 79 binds it against the shoulder 78. The lower part of the clamp is in two pieces, one piece 80 above the diaphragm and centered thereon by the boss 81 extending into the center opening 82 in the diaphragm, and the other piece 83 beneath the diaphragm, while the upper part of the clamp is in a single piece 84 and fits into a recess 85 in the upper part of the clamp 80. These two parts 80 and 84 are held together by cap screws 86. The lower surface of the part 84 is recessed as at 87, while the upper part of the portion 80 of the lower clamp is recessed as at 88, which recesses receive the head 17 of the spool and tightly bind the spool between the clamp portions 80 and 84 when the screws 86 are set up to bind the parts 80, 83, and 84 of the clamp together. There is a clearance between the side of the head 17 and the side walls of the recesses 87 and 88 to provide for the said head to be gripped only between the bottom walls of said recesses. A semi-spherical recess 89 extends inwardly from the bottom wall of recess 88 in line with the recess 18 and provides therewith a generally spherical recess in which is received a ball 90 from which a pull rod 91 extends freely through opening 92 in the upper part of the lower clamp 80 and through an opening 93 in the lower portion of the lower clamp 83. The recess 18 is made slightly larger than the portion of the ball 90 received therein and permits for relative movement between the ball and the walls of said recesses for self-aligning of the pull rod 91 axially with the axis of the spool.

In order to prevent excessive movement should any part break or should too great a pull be exerted, there are provided flanges 94 which extend inwardly from the housing 28 beneath shoulders 95 on the lower part of the clamp so that shoulders will engage the flange 94 and prevent excessive motion downwardly, while on the lower portion 83 of the clamp the collar 77 is provided with flanges 96 which may be engaged by the flanges 97 on the portion 83 of the clamp should there be excessive movement upwardly instead of downwardly as viewed in Figure 1.

The housing 28 is removably held in the opening 27 of support 26 by screws 98 (Fig. 5) which may be easily removed.

In use in tension a pull will be applied on the pull rod 91 which will be transmitted through the clamp engaging the lower head 17 of the spool to apply tension on the spool. The upper head being firmly held will permit of some slight elongation of the barrel portion 15 of the spool, and this slight elongation will be transmitted through the rod 20 to the gauging device 61 which will indicate the amount of pull due to the elongation of this metal barrel 15. The entire range of operation of the gauge will be no greater than .0015 of an inch movement of its stem. Should a tension be applied to cause a greater movement, the spring 65 will yield to protect the gauge. Within this range of elongation, upon the release of the pull, the spool through its inherent elasticity will recover its original position. If it is desired that pulls in excess of a predetermined amount be applied, this housing 28 and spool 15 may be removed by removal of the screws 98 and the frame 43 may be removed from the housing by removal of screws 46 and 47 and a housing and spool of different capacity substituted by mounting the frame 43 on the other housing and the whole unit back in the support 26 by means of the screws 98.

In using this device for testing, it is desirable to approximately zero the gauge 61 at a position of no tension location which may be easily done by turning the screw 52 to vary the position of the gauge on its support. To prevent movement, the gauge is then locked by screws 72. The gauge is then accurately zeroed electrically, and the zero may be shifted at will if it be desirable to study particularly some point intermediate the extreme limitation of pull under which the specimen is being tested.

Should some part fail, in order that the movement would not then be excessive, the stops 94, 95 will limit the movement of the pull on the lower part so that damage will not occur. Should by accident a pull be greater than the amount which the strain gauge will accommodate, the spring 65 will give so that the gauge will not be damaged. Otherwise, however, the spring will maintain rigid transmission of motion as if the spring were not present. In some cases a compression is desired to be evaluated instead of tension and in this case the coupling 100 will be substituted for the coupling 63. The member 101 with bore 102 will be similar to the bore 64 and will contain rod 20 and its head 22 which is urged in one direction by spring 103 acting between the head and split ring 104. This arrangement is all within housing 105 and a spring 106 acts between shoulder 107 of this housing and flange 108 of the inner portion in the opposite direction, which spring 106 will yield should too great an upward or compressive force be exerted. The clamp 109 is as described above for clamp 68.

I claim:

1. A device for measuring force comprising a spool having a central portion which is deformable in proportion to the tension applied, said spool having heads at its opposite ends and an axial bore therein, a housing, a rod secured to one of said heads and extending axially through said bore and beyond the spool in spaced relation to the walls of the bore, a coupling resiliently secured to the other end portion of said rod, a gauge, means connecting the gauge to said coupling, said gauge being responsive to the axial movement of the free end of the rod, a clamp secured to said housing for holding the head of the spool through which the rod freely extends, a clamp holding the head of the spool to which the rod is secured, a diaphragm for mounting said second clamp to said housing for movement relative to the first clamp in a direction axially of the spool, and means carried by the said second clamp through which force is applied, and a frame detachably secured to said first clamp, said gauge being secured to said frame, whereby said gauge may be detached from said coupling and said frame from said housing for interchanging said housing with a second housing having a spool of different capacity mounted thereon.

2. A device for measuring force comprising a spool having a central portion which is deformable in proportion to the tension applied thereon, said spool having heads at its opposite ends and an axial bore therein, a rod secured to one of said heads and extending axially through said bore in spaced relation therewith and beyond the other of said heads, a support, a first clamp mounted on said support to be held stationary therewith for detachably holding the head of the spool through which the rod extends, a second clamp mounted on said support for frictionless movement at a position spaced from the said first clamp for holding the other of said heads and movable in a direction axially of the spool, a gauge secured to the first said clamp and having an operating stem extending axially of said spool, means for detachably securing said stem to the free end of said rod for movement therewith, and means connected to said second clamp extending axially of said spool through which a force is applied to said second clamp.

3. A device as set forth in claim 2 including a diaphragm secured to said support, said second clamp being detachably mounted on said diaphragm.

4. A device as set forth in claim 2 including a diaphragm and means to secure said diaphragm to said support including an annulus having an abutment thereon providing a stop engageable by said movable clamp to limit the movement thereof in the direction of said abutment, said second clamp being detachably mounted on said diaphragm.

5. A device as set forth in claim 2 wherein said support has a bore therein forming a shoulder and said movable clamp extends through said bore and is provided with an abutment engageable with said shoulder to limit the movement of said clamp in the direction of said shoulder.

6. A device as set forth in claim 2 wherein the stationary held clamp comprises a member secured to said support and a second member secured to the said first member and between which members the head of the spool is secured.

7. A device as set forth in claim 2 wherein said means through which force is applied comprises a rod with a ball and socket connection to said second clamp and said head held by said second clamp is recessed to receive the ball.

8. A device as set forth in claim 2 wherein said means for detachably securing said stem is a resilient coupling.

9. A device as set forth in claim 2 wherein said stem has a shoulder thereon and said rod has an abutment at the free end thereof opposite to said shoulder, a compression spring engaged between said abutment and said shoulder through which spring movement of said rod is transmitted to said gauge.

10. A device as set forth in claim 2 wherein said support has a bore in which the said clamps and spool are positioned.

11. A device as set forth in claim 3 wherein said clamps with the spool and gauge secured thereto are removable from said support as a unit whereby said spool may be detached from said clamps and replaced with a spool of different capacity.

References Cited in the file of this patent

UNITED STATES PATENTS

| | | |
|---|---|---|
| 1,468,383 | Guy | Sept. 18, 1923 |
| 1,888,755 | Barr et al. | Nov. 22, 1932 |
| 2,004,660 | Hounsfield | June 11, 1935 |
| 2,492,164 | Lutts | Dec. 27, 1949 |
| 2,503,141 | Stone | Apr. 4, 1950 |
| 2,561,318 | Ruge | July 17, 1951 |